United States Patent
Takizawa et al.

(10) Patent No.: US 7,591,598 B2
(45) Date of Patent: *Sep. 22, 2009

(54) CAMERA HAVING A DUST-PROOFING MEMBER THAT IS VIBRATED TO REMOVE DUST, THE DUST-PROOFING MEMBER BEING PRESSED BY A SPRING PRESSING MEMBER TOWARD A SEALING PART THAT SEALS A SPACE BETWEEN THE DUST-PROOFING MEMBER AND AN IMAGE PICKUP-DEVICE

(75) Inventors: Hiroyuki Takizawa, Chofu (JP); Sumio Kawai, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/782,575

(22) Filed: Jul. 24, 2007

(65) Prior Publication Data

US 2008/0013945 A1    Jan. 17, 2008

Related U.S. Application Data

(63) Continuation of application No. 10/303,688, filed on Nov. 22, 2002, now Pat. No. 7,280,145.

(30) Foreign Application Priority Data

Jul. 30, 2002  (JP) ............................. 2002-221899

(51) Int. Cl.
*G03B 17/00* (2006.01)
*H04N 5/225* (2006.01)

(52) U.S. Cl. ..................................... 396/439; 348/374
(58) Field of Classification Search ................. 396/429, 396/439; 348/340, 342, 374; 257/433
See application file for complete search history.

(56) References Cited

U.S. PATENT DOCUMENTS 4,387,973 A    6/1983   Martin (Continued)

FOREIGN PATENT DOCUMENTS

JP    57-078032 A    5/1982

(Continued)

OTHER PUBLICATIONS

Japanese Office Action dated Mar. 11, 2008, issued by the Japanese Patent Office in Japanese Application No. 2002-153018 which is a counterpart of related U.S. Appl. No. 10/300,728 (now USP 7,339,623).

*Primary Examiner*—Jay M Patidar
(74) *Attorney, Agent, or Firm*—Frishauf, Holtz, Goodman & Chick, P.C.

(57) ABSTRACT

A camera includes a dust-proofing member which has a transparent portion through which a visible light component is transmitted. The transparent portion is opposed to the front of an image pick-up device at a predetermined interval. A vibration member is arranged at a peripheral portion of the dust-proofing member and vibrates the dust-proofing member. A sealing part seals a space between the image pick-up device and the dust-proofing member. And a spring pressing member presses the dust-proofing member at a periphery thereof toward the sealing part.

14 Claims, 12 Drawing Sheets

U.S. PATENT DOCUMENTS

| | | | |
|---|---|---|---|
| 4,441,796 | A | 4/1984 | Shaw |
| 4,841,387 | A | 6/1989 | Rindfuss |
| 4,896,217 | A | 1/1990 | Miyazawa et al. |
| 4,920,420 | A | 4/1990 | Sano et al. |
| 4,929,072 | A | 5/1990 | Fujie et al. |
| 4,998,800 | A | 3/1991 | Nishida et al. |
| 5,170,288 | A | 12/1992 | Imaizumi et al. |
| 5,227,888 | A | 7/1993 | Haga |
| 5,760,528 | A | 6/1998 | Tomikawa |
| 5,910,700 | A | 6/1999 | Crotzer |
| 5,995,279 | A | 11/1999 | Ogino et al. |
| 6,031,998 | A | 2/2000 | Shono |
| 6,078,438 | A | 6/2000 | Shibata et al. |
| 6,157,781 | A | 12/2000 | Konno et al. |
| 6,163,340 | A | 12/2000 | Yasuda |
| 6,564,018 | B2 | 5/2003 | Melman et al. |
| 6,583,819 | B2 | 6/2003 | Ito et al. |
| 6,778,325 | B2 | 8/2004 | Osawa |
| 7,006,138 | B2 | 2/2006 | Kawai |
| 7,280,145 | B2 | 10/2007 | Takizawa et al. |
| 7,324,148 | B2 | 1/2008 | Takizawa et al. |
| 7,324,149 | B2 | 1/2008 | Takizawa et al. |
| 7,339,623 | B2 | 3/2008 | Kawai |
| 2001/0053288 | A1 | 12/2001 | Ito et al. |
| 2001/0055072 | A1 | 12/2001 | Mogamiya et al. |
| 2002/0171751 | A1 | 11/2002 | Ohkawara |
| 2003/0214588 | A1 | 11/2003 | Takizawa et al. |
| 2003/0218685 | A1 | 11/2003 | Kawai |
| 2005/0280712 | A1 | 12/2005 | Kawai |
| 2007/0292126 | A1* | 12/2007 | Oshima .................. 396/429 |
| 2007/0296819 | A1 | 12/2007 | Takizawa et al. |
| 2008/0013945 | A1 | 1/2008 | Takizawa et al. |

FOREIGN PATENT DOCUMENTS

| | | | |
|---|---|---|---|
| JP | 59-006399 | U | 1/1984 |
| JP | 60-207107 | A | 10/1985 |
| JP | 61-035469 | U | 3/1986 |
| JP | 62-165127 | A | 7/1987 |
| JP | 63-009970 | A | 1/1988 |
| JP | 63-114166 | A | 5/1988 |
| JP | 63-131498 | U | 8/1988 |
| JP | 01-230016 | A | 9/1989 |
| JP | 02-001699 | A | 1/1990 |
| JP | 2-20971 | A | 1/1990 |
| JP | 2-065369 | U | 5/1990 |
| JP | 02-132860 | A | 5/1990 |
| JP | 02-154238 | A | 6/1990 |
| JP | 3-218670 | A | 9/1991 |
| JP | 03-244281 | A | 10/1991 |
| JP | 4-047769 | A | 2/1992 |
| JP | 04-104918 | A | 4/1992 |
| JP | 4-116478 | A | 10/1992 |
| JP | 05-167051 | A | 7/1993 |
| JP | 05-213286 | A | 8/1993 |
| JP | 58-152201 | A | 9/1993 |
| JP | 6-214142 | A | 8/1994 |
| JP | 07-151946 | A | 6/1995 |
| JP | 7-222068 | A | 8/1995 |
| JP | 07-281021 | A | 10/1995 |
| JP | 07-322153 | A | 12/1995 |
| JP | 08-079633 | A | 3/1996 |
| JP | 08-256975 | A | 10/1996 |
| JP | 09-124366 | A | 5/1997 |
| JP | 09-130654 | A | 5/1997 |
| JP | 2809133 | A | 7/1998 |
| JP | 10-268129 | A | 10/1998 |
| JP | 11-8421 | A | 1/1999 |
| JP | 11-109203 | A | 4/1999 |
| JP | 11-284246 | A | 10/1999 |
| JP | 2000-28887 | A | 1/2000 |
| JP | 2000-029132 | A | 1/2000 |
| JP | 2000-066021 | A | 3/2000 |
| JP | 2000-124519 | A | 4/2000 |
| JP | 2000-330054 | A | 11/2000 |
| JP | 2000-350068 | A | 12/2000 |
| JP | 2001-257945 | A | 9/2001 |
| JP | 2001-298640 | A | 10/2001 |
| JP | 2001-330955 | A | 12/2001 |
| JP | 2001-339055 | A | 12/2001 |
| JP | 2001-345392 | A | 12/2001 |
| JP | 2001-358974 | A | 12/2001 |
| JP | 2001-359287 | A | 12/2001 |
| JP | 2002-050751 | A | 2/2002 |
| JP | 2002-107612 | A | 4/2002 |
| JP | 2002-204379 | A | 7/2002 |
| JP | 2002-229110 | A | 8/2002 |
| JP | 2003-333391 | A | 11/2003 |

* cited by examiner

CAMERA HAVING A DUST-PROOFING MEMBER THAT IS VIBRATED TO REMOVE DUST, THE DUST-PROOFING MEMBER BEING PRESSED BY A SPRING PRESSING MEMBER TOWARD A SEALING PART THAT SEALS A SPACE BETWEEN THE DUST-PROOFING MEMBER AND AN IMAGE PICKUP-DEVICE

The present application is a Continuation Application of U.S. application Ser. No. 10/303,688, now U.S. Pat. No. 7,280,145, filed Nov. 22, 2002, which claims the benefit of Japanese Application No. 2002-221899 filed on Jul. 30, 2002, the entire contents of which are incorporated herein by reference.

BACKGROUND OF THE INVENTION

1. Field of the Invention

The present invention relates to an image pick-up device unit having an image pick-up device for obtaining an image signal corresponding to light irradiated on a photoelectrically converting surface thereof or a camera having the image pick-up device unit. More particularly, the present invention relates to the improvement of a camera, such as an interchangeable single-lens reflex digital camera.

2. Description of the Related Art

Recently, digital cameras such as a so-called digital still camera or a digital video camera (hereinafter, referred to as a digital camera or simply referred to as a camera) are generally put into practical use and are widely spread. In the digital cameras, a subject image formed based on beams from a subject (hereinafter, referred to as subject beams), which are transmitted through a photographing optical system (also referred to as a photographing lens) is formed onto a photoelectrically converting surface of a solid image pick-up device arranged at a predetermined position, such as a CCD (Charge Coupled Device, hereinafter, simply referred to as an image pick-up device). Further, an electrical image signal or the like representing a desired subject image is generated by using an photoelectrically converting action of the image pick-up devices. A signal based on the image signal and the like are outputted to a predetermined display device such as an LCD (Liquid Crystal Display) and an image or the like is displayed. The image signal or the like generated by the image pick-up device is recorded to a predetermined recording area of a predetermined recording medium as predetermined-format image data. Further, the image data recorded to the recording medium is read and the image data is converted to become an image signal which is optimum for a display using the display device. Thereafter, an image corresponding thereto is displayed based on the processed image signal.

In general, digital cameras have an optical finder device for observing, prior to a photographing operation, a desired subject as a photographing target and for setting a photographing range including the subject.

In general, a so-called single-lens reflex finder device is used as the optical finder device. In this single-lens reflex finder device, the advancing direction of the subject beams transmitted through the photographing optical system is bent by using a reflecting member arranged on the optical axis of the photographing optical system such that the subject image for observation is formed at a predetermined position. On the other hand, upon the photographing operation, the reflecting member is evacuated from the optical axis of the photographing optical system, thereby guiding the subject beams onto a light receiving surface of the image pick-up device, that is, onto a photoelectrically converting surface thereof and forming the subject image for photographing on the photoelectrically converting surface.

Furthermore, recently, a so-called interchangeable lens digital camera having the single-lens reflex finder device is generally put into practical use. In the interchangeable lens digital camera, the photographing optical system is detachable to a camera main body, and a plurality of types of the photographing optical systems are selectively used in the single-camera main body by arbitrarily detaching and exchanging a desired photographing optical system in accordance with user's desire.

In the above-mentioned interchangeable lens digital camera, dust and the like floating in the air possibly enter the camera main body upon detaching the photographing optical system from the camera main body. Various mechanisms which are mechanically operated such as a shutter and a stop mechanism are arranged in the camera main body and thus, dangerously, the dust is possibly generated from the various mechanisms during the operation.

Upon detaching the photographing optical system from the camera main body, the light receiving surface (also referred to as the photoelectrically converting surface) of the image pick-up device arranged in the rear of the photographing optical system is exposed in the ambient air of the camera. Therefore, dust and the like are adhered to the photographing converting surface of the image pick-up device due to electric charge action and the like.

Then, for the conventional single-lens reflex digital cameras, for example, Japanese Unexamined Patent Application Publication No. 2000-29132 proposes a technology for suppressing the adhesion of dust and the like on the light receiving surface of the image pick-up device due to the electric charge action.

Means disclosed in Japanese Unexamined Patent Application Publication No. 2000-29132 suppresses the adhesion of dust and the like onto the light receiving surface of the image pick-up device due to the electric charge action by providing a transparent electrode onto the surface of a cover member for covering the light receiving surface of the image pick-up device provided in the camera and by applying to the transparent electrode a DC voltage or an AC voltage with several kHz to 20 kHz.

The means for neutralizing electric charges generated to the image pick-up device disclosed in the above publication suppresses the adhesion of dust and the like onto the light receiving surface of the image pick-up device due to static electricity.

On the other hand, as the image pick-up device in the conventional digital cameras, a packaged image pick-up device (e.g., referred to as a packaged CCD) is widely used. In addition to the above-mentioned image pick-up device, recently, the supply of a so-called bare CCD chip is proposed.

For example, Japanese Unexamined Patent Application Publication No. 9-130654 discloses means for shaking off dust and the like which are adhered to the photoelectrically converting surface by providing a member for vibration such as a piezoelectric element between the bare chip CCD and a substrate on which the bare chip CCD is placed and by applying a predetermined voltage to the member for vibration because dust and the like are much likely to adhere onto the photoelectrically converting surface in the bare chip CCD in many cases.

However, the means disclosed in Japanese Unexamined Patent Application Publication No. 2000-29132 suppresses the adhesion of dust and the like by neutralizing electric charges of the electrostatically-charged image pick-up device. Consequently, the means is not optimum as means for removing dust which is adhered or deposited to the photoelectrically converting surface of the image pick-up device, irrespective of the static electricity.

Moreover, the means disclosed in Japanese Unexamined Patent Application Publication No. 9-130654 can not be optimally applied to the image pick-up device such as the packaged CCD generally used for the conventional digital cameras because the means is devised in view of the bare chip CCD.

In other words, when the means disclosed in Japanese Unexamined Patent Application Publication No. 9-130654 is applied to the general packaged CCD or the like, vibrations to the image pick-up device or the package are applied. Thus, there is a possibility that the vibrating action adversely influences on various mechanisms arranged to the image pick-up device and near it, for example, causes the deterioration in mechanisms and the occurrence of errors.

SUMMARY OF THE INVENTION

Accordingly, it is an object of the present invention to provide a camera having a dust-proofing member at a predetermined position in front of an image pick-up device, in which the number of members arranged between a photographing optical system and the image pick-up device is reduced, and a high degree of freedom is ensured on optical design of the photographing optical system by reducing the size of a camera main body unit, and particularly, by reducing the dimension in the depth direction of the camera main body unit and by decreasing a flange back. And it is also an object of the invention to provide an image pick-up device unit used for the camera.

Briefly, according to a first aspect of the invention, a camera comprises: an image pick-up device which obtains an image signal corresponding to beams irradiated onto a photoelectrically converting surface thereof; a photographing lens which inputs a subject image onto the photoelectrically converting surface of the image pick-up device; a dust-proofing member comprising a transparent portion through which a visible light component is transmitted among the beams incident from the photographing lens and which absorbs an infrared component, opposed to the front of the image pick-up device at a predetermined interval; a member for vibration arranged at a peripheral portion of the dust-proofing member, which applies vibrations to the dust-proofing member; a sealing structure portion arranged at a portion formed by opposing the image pick-up device and the dust-proofing member, for sealing a space portion that is substantially sealed at peripheral portions of the image pick-up device and the dust-proofing member; and an image signal processing circuit which converts an image signal obtained from the image pick-up device, corresponding to an image formed onto the photoelectrically converting surface of the image pick-up device, into a signal suitable to recording.

According to a second aspect of the invention, an image pick-up device unit comprises: an image pick-up device which obtains an image signal corresponding to beams irradiated onto a photoelectrically converting surface thereof; an optical member opposed to the front of the image pick-up device at a predetermined interval, which absorbs an infrared component; a member for vibration arranged at a peripheral portion of the optical member, which applies vibrations to the optical member; and a sealing structure portion arranged at a portion formed by opposing the image pick-up device and the optical member, for sealing a space portion that is substantially sealed at peripheral portions of the image pick-up device and the optical member.

According to a third aspect of the invention, a camera comprises: an image pick-up device which obtains an image signal corresponding to beams irradiated onto a photoelectrically converting surface thereof; a photographing lens which inputs a subject image onto a photoelectrically converting surface of the image pick-up device; a dust-proofing member having a transparent portion through which a visible light component is transmitted among beams incident from the photographing lens and which limits the transmission of a predetermined high spatial frequency component, opposed to the front of the image pick-up device at a predetermined interval; a member for vibration arranged to a peripheral portion of the dust-proofing member, which applies vibrations to the dust-proofing member; a sealing structure portion arranged at a portion formed by opposing the image pick-up device and the dust-proofing member, for sealing a space portion that is substantially sealed at peripheral portions of the image pick-up device and the dust-proofing member; and an image signal processing circuit which converts an image signal obtained from the image pick-up device, corresponding to an image formed onto the photoelectrically converting surface of the image pick-up device, into a signal suitable to recording.

According to a fourth aspect of the invention, an image pick-up device unit comprises: an image pick-up device which obtains an image signal corresponding to beams irradiated onto a photoelectrically converting surface thereof; an optical member opposed to the front of the image pick-up device at a predetermined interval, the optical member limits the transmission of a predetermined high spatial frequency component; a member for vibration arranged at a peripheral portion of the optical member, which applies vibrations to the optical member; and a sealing structure portion arranged at a portion formed by opposing the image pick-up device and the optical member, for sealing a space portion that is substantially sealed at peripheral portions of the image pick-up device and the optical member.

The above-mentioned and other objects and benefits of the present invention will be obvious from the following detailed description.

According to the present invention, there are provided the camera having the dust-proofing member at the predetermined position in front of the image pick-up device and the image pick-up device unit used for the camera. In the camera, the number of members arranged between a photographing optical system and an image pick-up device is reduced, and a high degree of freedom is ensured on optical design of the photographing optical system by reducing the size of the camera main body unit, and particularly, by reducing the dimension in the depth direction of the camera main body unit and by decreasing a flange back.

DESCRIPTION OF THE PREFERRED EMBODIMENTS

First, a description is given of the schematic structure of a camera according to a first embodiment of the present invention.

Figure 1:
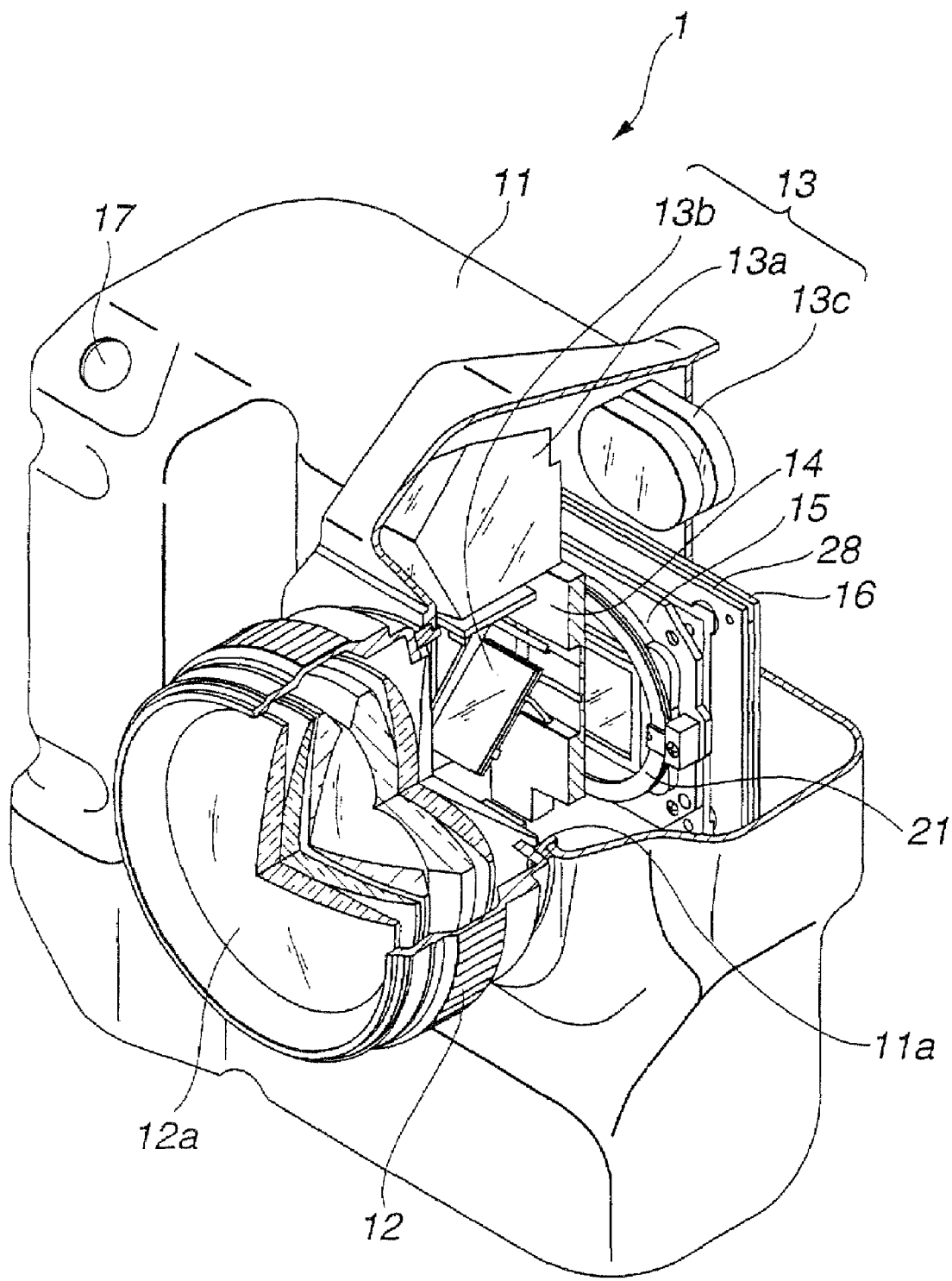
FIG. 1 is a perspective view schematically showing the internal structure of a camera by cutting off a part of the camera according to a first embodiment of the present invention.
Figure 2:
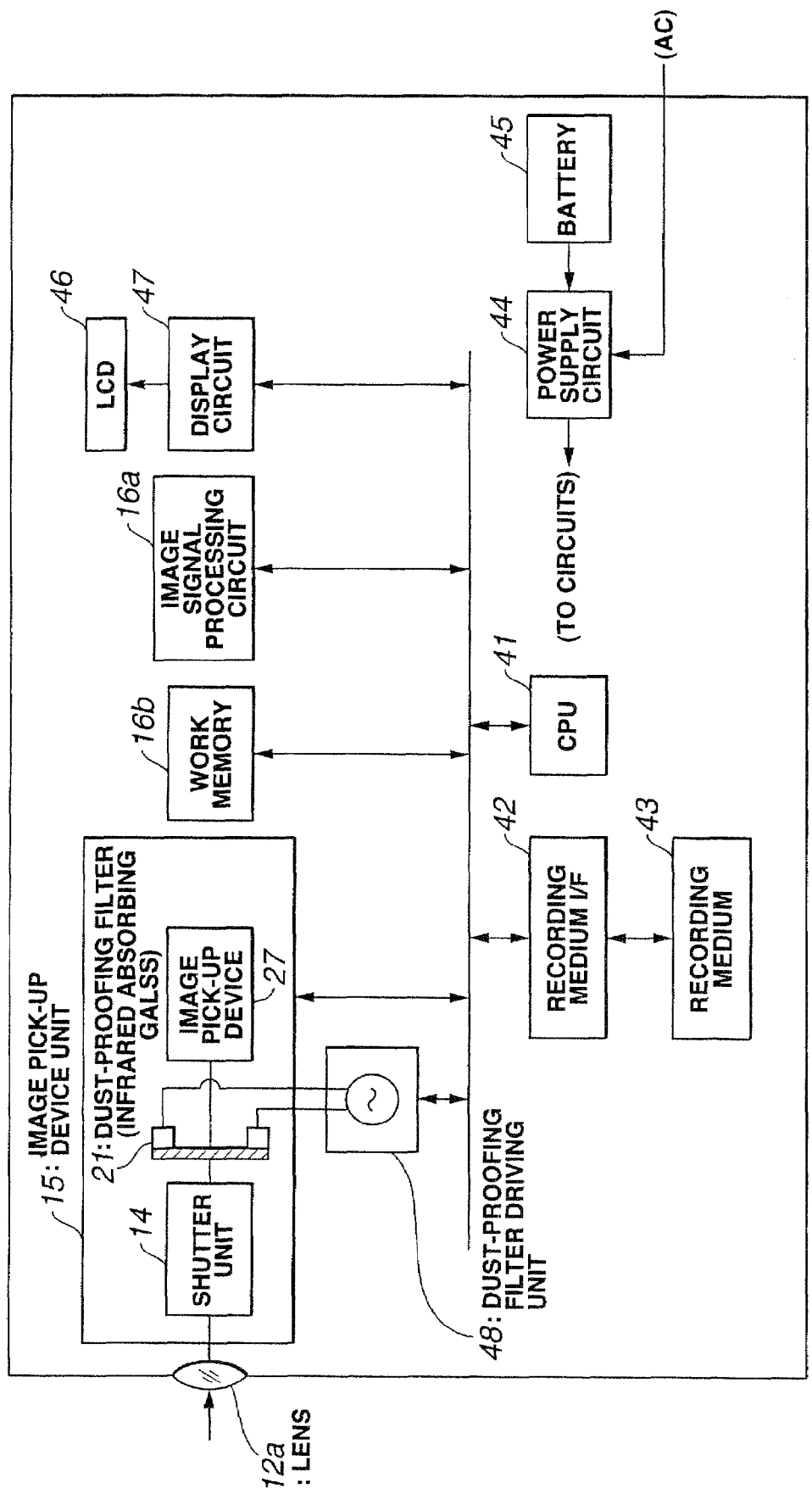
FIG. 2 is a block diagram schematically mainly showing the electrical structure of the camera shown in FIG. 1.

FIGS. 1 and 2 are diagrams showing the schematic structure of the camera according to the first embodiment of the present invention. FIG. 1 is a perspective view schematically showing the internal structure of a cut-off part of the camera, and FIG. 2 is a block diagram schematically showing mainly the electrical structure of the camera.

According to the first embodiment, a camera 1 comprises a camera main body unit 11 and a lens barrel 12 which are provided separately. The camera main body unit 11 and the lens barrel 12 are detachable to each other.

The lens barrel 12 holds a photographing optical system (photographing lenses) 12a comprising a plurality of lenses and a driving mechanism of the photographing lenses. The photographing optical system 12a comprises a plurality of optical lenses for forming a subject image formed by subject beams by transmitting the beams from a subject at a predetermined position (at a predetermined position on a photoelectrically converting surface of an image pick-up device 27, which will be described later). The lens barrel 12 is projected toward the front side of the camera main body unit 11.

The lens barrel 12 uses generally-used ones in conventional cameras. Therefore, a description of the detailed structure is omitted.

The camera main body unit 11 is a so-called single-lens reflex camera comprising various members therein, and is further having a photographing optical system attaching unit (referred to as a photographing lens attaching unit) 11a in front thereof as a connecting member for detachably arranging the lens barrel 12 for holding the photographing optical system 12a.

In other words, an opening for exposure having a predetermined diameter for guiding the subject beams in the camera main body unit 11 is formed substantially in the center in front of the camera main body unit 11. The photographing optical system attaching unit 11a is formed at a peripheral portion of the opening for exposure.

The above-mentioned photographing optical system attaching unit 11a is arranged in front of an outer-surface side of the camera main body unit 11. In addition, various operating members for operating the camera main body unit 11, e.g., a release button 17 for generating an instruction signal to start the photographing operation and the like are arranged at a predetermined position on an upper-surface portion or a back-surface portion of the camera main body unit 11. Since the operating members do not directly relate to the present invention, a description and an illustration of the operating members except for the release button 17 are omitted for the purpose of preventing the complication of the drawing.

Referring to FIG. 1, in the camera main body unit 11, various members are arranged at predetermined positions. For example, the camera main body unit 11 comprises: a finder device 13 forming a so-called observation optical system, provided for forming a desired subject image formed by the photographing optical system (lens) 12a at a predetermined position different from that on the photoelectrically converting surface of the image pick-up device 27 (refer to FIG. 2); a shutter unit 14 having a shutter mechanism and the like for controlling an irradiation time and the like of the subject beams onto the photoelectrically converting surface of the image pick-up device 27; an image pick-up device unit 15 as an assembly, including the shutter unit 14, of the image pick-up device 27 for obtaining an image signal corresponding to the subject image formed based on the subject beams which are transmitted through the photographing optical system 12a, and a dust-proofing member 21 (which will be described in detail later) for preventing the adhesion of dust and the like to the photoelectrically converting surface of the image pick-up device 27, arranged at a predetermined position in front of the photoelectrically converting surface; and a plurality of circuit boards (only a main circuit board 16 is illustrated in FIG. 1) such as a main circuit board 16 on which various electrical members forming an electrical circuit, e.g., an image signal processing circuit 16a (refer to FIG. 2) for various signal processing to the image signal obtained by the image pick-up device 27, are mounted.

The finder device 13 comprises a reflecting mirror 13b for bending and guiding an optical axis of the subject beams transmitted through the photographing optical system 12a to an observation optical system, a roof prism 13a for receiving the beams outputted from the reflecting mirror 13b and for forming an erecting image, an ocular lens 13c for enlarging the image formed by the roof prism 13a and for forming an image optimum for observation, and the like.

The reflecting mirror 13b is movable between a position evacuating from the optical axis of the photographing optical system 12a and a predetermined position on the optical axis, and is arranged at a predetermined angle, e.g., 45° with respect to the optical axis of the photographing optical system 12a in a normal status. Thus, the optical axis of the subject beams transmitted through the photographing optical system 12a is bent by the reflecting mirror 13b when the camera 1 is in the normal status, and is reflected to the roof prism 13a arranged in an upper direction of the reflecting mirror 13b.

Upon executing the photographing operation of the camera 1, the reflecting mirror 13b is moved to a predetermined position evacuated from the optical axis of the photographing optical system 12a during the actual exposure operation. Consequently, the subject beams are guided to the image pick-up device 27 side and irradiate the photoelectrically converting surface.

The shutter unit 14 uses the same focal plane type shutter mechanism, driving circuit for controlling the operation of the shutter mechanism, etc. as those generally used in the conventional cameras. Therefore, a description of the detailed structure is omitted.

Referring to FIG. 1, a member shown by reference numeral 28 is an image pick-up device fixing plate 28 for fixing and supporting the image pick-up device 27 (which will be described later).

As mentioned above, a plurality of circuit boards are arranged in the camera 1, and form various electrical circuits. Referring to FIG. 2, as the electrical structure, the camera 1 comprises: a CPU 41 as a control circuit for systematically controlling the entire camera 1; the image signal processing circuit 16a for performing various signal processing such as signal processing for converting the image signal obtained by the image pick-up device 27 into a signal suitable to a recording format; a work memory 16b for temporarily recording the image signal and image data processed by the image signal processing circuit 16a and various information in associated therewith; a recording medium 43 for recording the image data for recording in a predetermined format generated by the image signal processing circuit 16a to a predetermined area; a recording medium interface 42 for electrically connecting the recording medium 43 to the electrical circuits of the camera 1, a display unit 46 comprising a liquid crystal display device (LCD) for displaying the image; a display circuit 47 for electrically connecting the display unit 46 to the camera 1, receiving the image signal processed by the image signal processing circuit 16a, and generating an image signal for display optimum to the display operation by using the display unit 46; a battery 45 comprising a secondary battery such as a dry cell; a power supply circuit 44 for receiving power from the battery 45 or from external power supply (AC) supplied by a predetermined connection cable (not shown), controlling the power to match the operation of the camera 1, and supplying electricity to the electrical circuits; and a dust-proofing member driving unit 48 as the electrical circuit for driving the dust-proofing member 21 included in the image pick-up device unit 15, comprising an oscillator, and the like.

Next, a detailed description is given of the image pick-up device unit 15 in the camera 1 according to the first embodiment.

Figure 3:
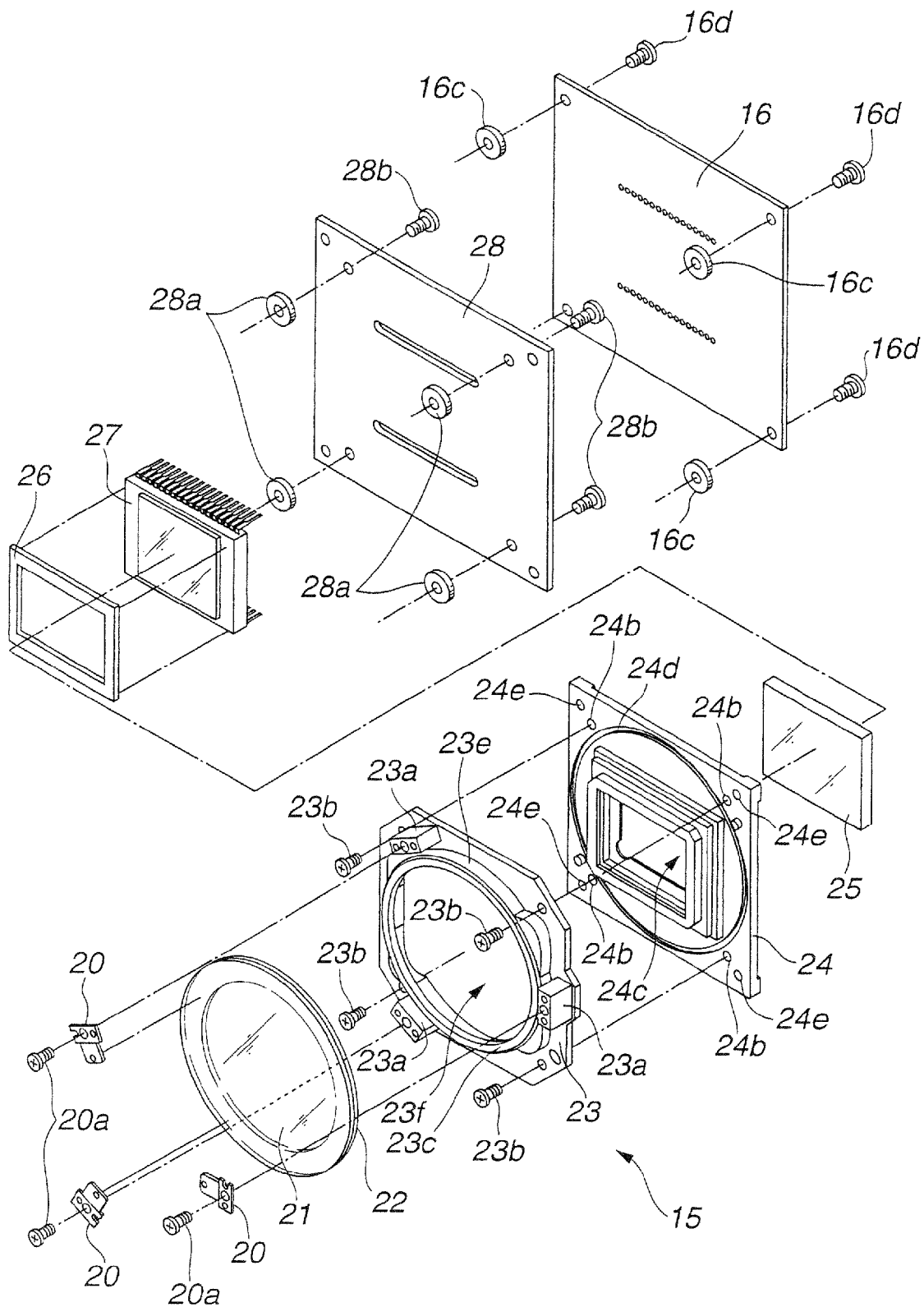
FIG. 3 is a diagram showing by extracting a part of an image pick-up device unit in the camera shown in FIG. 1, that is, a main-part exploded perspective view showing the disassembled image pick-up device unit.
Figure 4:
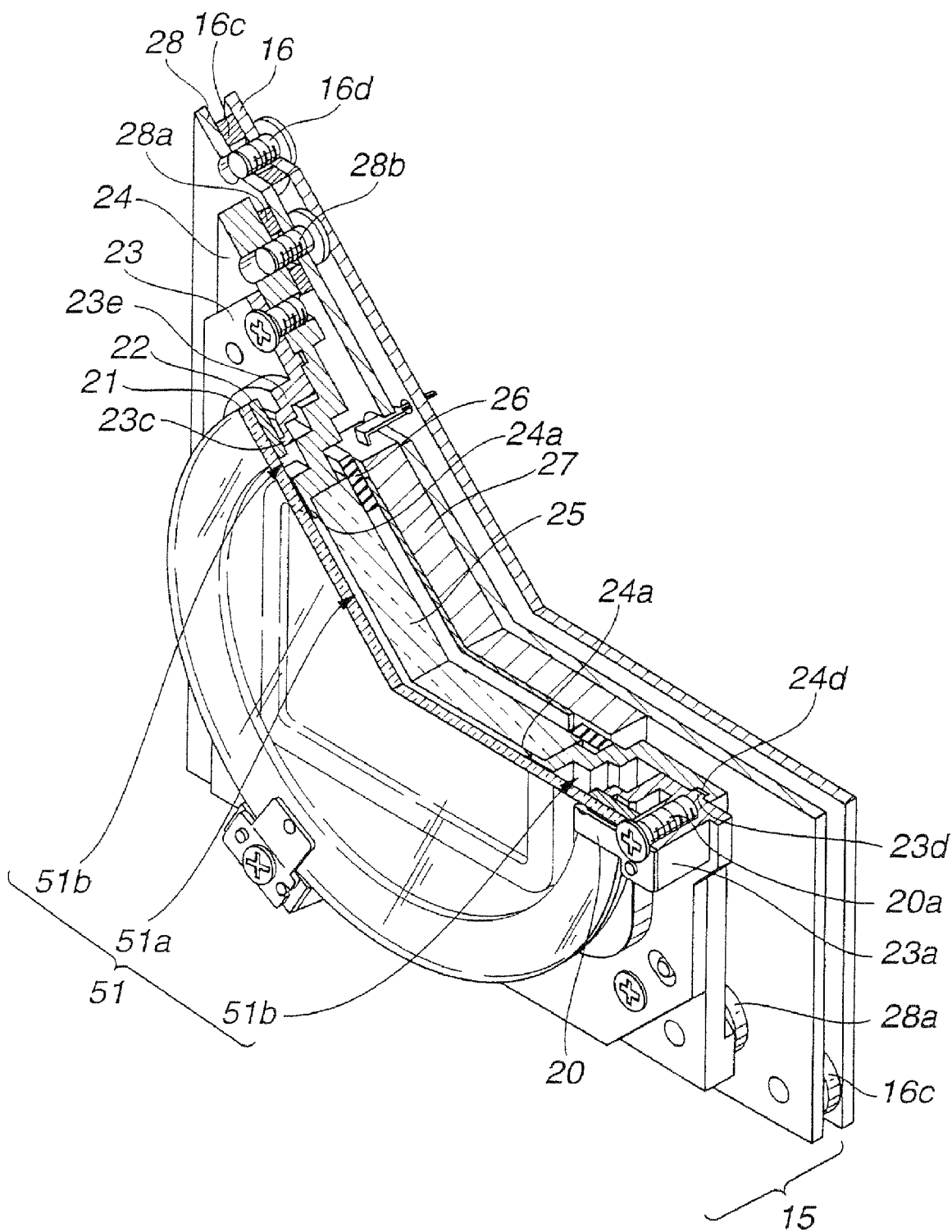
FIG. 4 is a perspective view showing a cut-off part of the assembled image pick-up device unit in the camera shown in FIG. 1.
Figure 5:
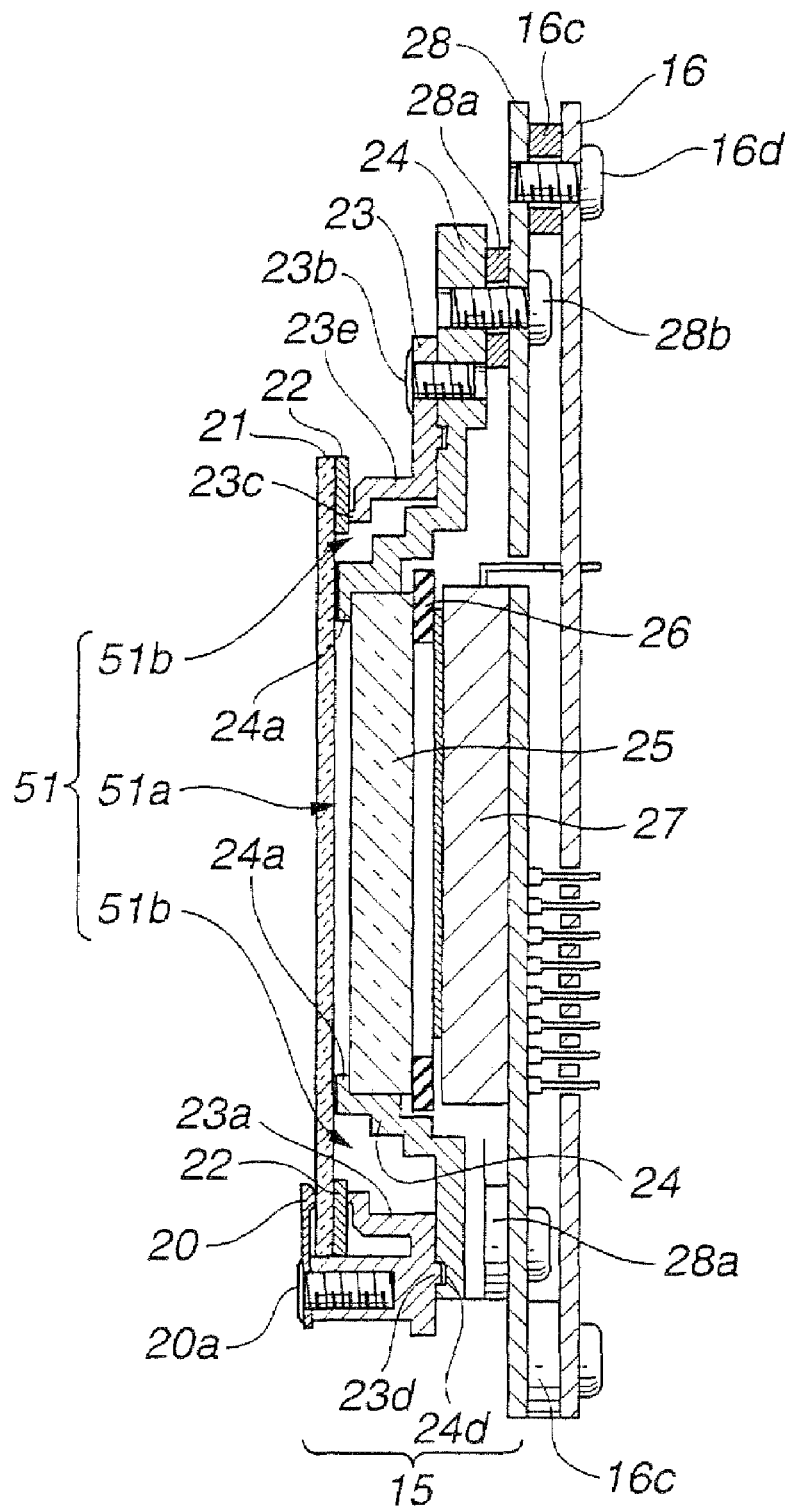
FIG. 5 is a sectional view along a cut-off plane of FIG. 4.

FIGS. 3 to 5 are diagrams showing by extracting a part of the image pick-up device unit in the camera 1 according to the first embodiment. FIG. 3 is a main-part exploded perspective view showing the structure of the disassembled image pick-up device unit. FIG. 4 is a perspective view showing a cut-off part of the assembled image pick-up device unit. FIG. 5 is a sectional view along a cut-off plane shown in FIG. 4.

According to the first embodiment, as mentioned above, the image pick-up device unit 15 in the camera 1 is a unit comprising a plurality of members such as the shutter unit 14. However, referring to FIGS. 3 to 5, the main portion is only shown and an illustration of the shutter unit 14 is omitted. For the purpose of showing a positional relationship of the members, referring to FIGS. 3 to 5, the image pick-up device 27 is loaded while the members are provided near the image pick-up device unit 15, and the main circuit board 16 on which the image pick-up system electrical circuits comprising the image signal processing circuit 16a and the work memory 16b are mounted is illustrated. The main circuit board 16 is one of main circuit boards generally used in the conventional cameras, and a detailed description thereof is omitted.

The image pick-up device unit 15 comprises: the image pick-up device 27 comprising the CCD and the like, which obtains the image signal corresponding to the light transmitted-through the photographing optical system 12a (refer to FIG. 1) and irradiated to the photoelectrically converting surface thereof; the image pick-up device fixing plate 28 comprising a thin-sheet member for fixing and supporting the image pick-up device 27; an optical low-pass filter (hereinafter, referred to as an optical LPF) 25 arranged on the side of the photoelectrically converting surface of the image pick-up device 27, as an optical device which is formed to remove high frequency components from the subject beams transmitted and irradiated through the photographing optical system 12a; a low-pass filter supporting member 26 provided in the periphery between the optical LPF 25 and the image pick-up device 27, which is made of substantially-frame-shaped elastic members; an image pick-up device accommodating case member 24 (hereinafter, referred to as a CCD case 24) which accommodates, fixes, and holds the image pick-up device 27, supports the optical LPF 25 in contact with a peripheral portion or an adjacent portion of the optical LPF 25 and which comes into closely contact with a dust-proofing member supporting member 23, which will be described later, at a predetermined portion; the dust-proofing member supporting member 23 which is arranged in front of the CCD case 24 and comes into contact with a dust-proofing member 21 at a peripheral portion to an adjacent portion thereof and supports it; the dust-proofing member 21, which is supported by the dust-proofing member supporting member 23 and which is arranged at a predetermined position at a predetermined interval to the optical LPF 25, in the front of the optical LPF 25 on the side of the photoelectrically converting surface of the image pick-up device 27; a piezoelectric element 22 annularly arranged at a peripheral portion of the dust-proofing member 21 for applying predetermined vibrations to the dust-proofing member 21, and which comprises an electromechanical transducing device such as a piezoelectric ceramic; a pressing member 20 comprising an elastic member which airtightly joints the dust-proofing member 21 to the dust-proofing member supporting member 23; and the like.

The image pick-up device 27 obtains the image signal corresponding to the subject image formed onto the photoelectrically converting surface thereof by receiving the subject beams transmitted through the photographing optical system 12a onto the photoelectrically converting surface thereof and by performing photoelectrically converting processing, and applies a CCD (Charge Coupled Device) for it, for example.

The image pick-up device 27 is mounted at a predetermined position on the main circuit board 16 with the image pick-up device fixing plate 28 interposed therebetween. As mentioned above, the image signal processing circuit 16a, the work memory 16b, etc. are mounted on the main circuit board 16 such that an output signal from the image pick-up device 27, that is, the image signal obtained by the photoelectrically converting processing is electrically transmitted to the image signal processing circuit 16a or the like.

The signal processing in the image signal processing circuit 16a includes various signal processing, for example, processing in which the image signal obtained from the image pick-up device 27, as the one corresponding to the image formed onto the photoelectrically converting surface of the image pick-up device 27 by the photographing optical system 12a held in the lens barrel 12 loaded to the photographing optical system attaching unit 11a, is converted into a signal matching the recording. The above-mentioned signal processing is the same as processing for treating a digital image signal, which is commonly performed in the general digital cameras. Therefore, a detailed description of various signal processing which is usually executed in the camera 1 is omitted.

The optical LPF 25 is arranged in front of the image pick-up device 27 with being sandwiched by the low-pass filter supporting member 26 therebetween. The CCD case 24 is arranged to cover the optical LPF 25.

That is, an opening 24c which is rectangular-shaped substantially in the center is provided for the CCD case 24. The optical LPF 25 and the image pick-up device 27 are arranged from the back side of the opening 24c therefrom. Referring to FIGS. 4 and 5, a step portion 24a whose cross section is substantially L-shaped is formed at an inner peripheral portion of the back side of the opening 24c.

As mentioned above, the low-pass filter supporting member 26 made of the elastic member or the like is arranged between the optical LPF 25 and the image pick-up device 27. In the peripheral portion in front of the image pick-up device 27, the low-pass filter supporting member 26 is arranged at a position for evacuating a valid range of the beams incident on the photoelectrically converting surface at the periphery of the image pick-up device 27 in the front thereof, and is abutted onto an adjacent portion of the periphery behind the optical LPF 25. The airtightness is substantially held between the optical LPF 25 and the image pick-up device 27. Thus, elastic force generated by the low-pass filter supporting member 26 acts to the optical LPF 25 in the optical axis direction.

Then, the peripheral portion in front of the optical LPF 25 airtightly comes into contact with the step portion 24a of the CCD case 24. Thus, the position of the optical LPF 25 in the optical axis direction is regulated against the elastic force which is generated by the low-pass filter supporting member 26 and tends to displace the optical LPF 25 in the optical axis direction.

In other words, the optical LPF 25 inserted from the back side into the opening 24c of the CCD case 24 is subjected to the position regulation in the optical direction by the step portion 24a. Consequently, it is possible to prevent the optical LPF 25 from breaking away from the inside of the CCD case 24 to the front side.

As mentioned above, after inserting the optical LPF 25 in the opening 24c of the CCD case 24 from the back side, the image pick-up device 27 is arranged on the back side of the optical LPF 25. In this case, the low-pass filter supporting member 26 is sandwiched between the optical LPF 25 and the image pick-up device 27 in the peripheral portion.

Further, as mentioned above, the image pick-up device 27 is mounted on the main circuit board 16 while sandwiching the image pick-up device fixing plate 28 interposed. The image pick-up device fixing plate 28 is fixed to a screw hole 24e from the back of the CCD case 24 by a screw 28b via a spacer 28a interposed. The main circuit board 16 is also fixed to the image pick-up device fixing plate 28 by a screw 16d via a spacer 16c interposed.

In front of the CCD case 24, the dust-proofing member supporting member 23 is fixed to the screw hole 24b of the CCD case 24 by a screw 23b. In this case, a circumferential groove 24d is substantially annularly formed at a predetermined position in front of the CCD case 24 in the peripheral side thereof, as will be described in detail in FIGS. 4 and 5. On the other hand, at a predetermined position on the back and the peripheral side of the dust-proofing member supporting member 23, an annular convex portion 23d (not shown in FIG. 3) corresponding to the circumferential groove 24d of the CCD 24 is formed throughout the circumference with a substantially annular shape. Therefore, by fitting the annular convex portion 23d to the circumferential groove 24d, the CCD case 24 and the dust-proofing member supporting member 23 are substantially airtightly fit to in an annular area, that is, in an area in which the circumferential groove 24d and the annular convex portion 23d are formed.

The dust-proofing member 21 is constituted by the infrared absorbing glass which can absorb the infrared, such as the fluorine phosphoric acid glass and the like. The dust-proofing member 21 is an optical member which is circularly to polygonally plate-shaped as a whole, and which forms a transparent portion as at least an area having a predetermined length in a radial direction from the center of the dust-proofing member 21. The transparent portion is an optical member which is opposed and arranged in front of the optical LPF 25 at a predetermined interval.

At the peripheral portion of one surface of the dust-proofing member 21 (at the back surface side thereof according to the first embodiment), the piezoelectric element 22 as the predetermined member for vibration comprising an electro-mechanical transducing device for vibrating the dust-proofing member 21 is integrally formed, by using adhering means such as an adhesive. The piezoelectric element 22 applies predetermined vibrations to the dust-proofing member 21 by applying a predetermined driving voltage from the outside.

The dust-proofing member 21 is fixed and held by the pressing member 20 made of the elastic member such as a plate-shaped spring so as to airtightly joint to the dust-proofing member supporting member 23.

A circular or polygonal opening 23f is provided substantially in the center of the dust-proofing member supporting member 23. The opening 23f is set to a size large enough to have the subject beams which are transmitted through the photographing optical system 12a pass through, and to irradiate the photoelectrically converting surface of the image pick-up device 27 arranged at the back.

A wall portion 23e (refer to FIGS. 4 and 5) projecting toward the front side is annularly formed at a peripheral portion of the opening 23f. Further, a supporting portion 23c is formed such that it projects further toward the front side at the edge of the wall portion 23e.

A plurality of (three, according to the first embodiment) projecting portions 23a with a substantially rectangular shape are formed to project toward the front side, near an outer peripheral portion in front of the dust-proofing member supporting member 23. The projecting portions 23a are portions formed to fix the pressing member 20 for fixing and holding the dust-proofing member 21. The pressing member 20 is fixed by fastening means such as fixing screws 20a to the edges of the projecting portions 23a.

The pressing member 20 is a member made of the elastic member such as a plate spring, and a base end portion of the pressing member 20 is fixed to the projecting portion 23a. Further, a free end portion thereof is abutted on an outer peripheral portion of the dust-proofing member 21, thereby pressing the dust-proofing member 21 toward the side of the dust-proofing member supporting member 23, that is, in the optical axis direction.

In this case, a predetermined portion of the piezoelectric element 22 arranged at the outer peripheral portion at the back of the dust-proofing member 21 is abutted onto the supporting portion 23c, thereby regulating the positions of the dust-proofing member 21 and the piezoelectric element 22 in the optical axis direction. Therefore, the dust-proofing member 21 is fixed and held to be airtightly jointed to the dust-proofing member supporting member 23 with the piezoelectric element 22 interposed therebetween.

In other words, the dust-proofing member supporting member 23 is airtightly jointed to the dust-proofing member 21 via the piezoelectric element 22 interposed by a pressing force generated by the pressing member 20.

As mentioned above, with respect to the dust-proofing member supporting member 23 and the CCD case 24, the circumferential groove 24d and the annular convex portion 23d (refer to FIGS. 4 and 5) are substantially airtightly fixed. Further, the dust-proofing member supporting member 23 is airtightly jointed to the dust-proofing member 21 via the piezoelectric element 22 interposed by the pressing force generated by the pressing member 20. The optical LPF 25 arranged to the CCD case 24 is substantially airtightly arranged between the peripheral portion in front of the optical LPF 25 and the step portion 24a of the CCD case 24. Further, the image pick-up device 27 is arranged at the back of the optical LPF 25 via the low-pass filter supporting member 26 interposed. The airtightness is substantially held also between the optical LPF 25 and the image pick-up device 27.

Therefore, in a space formed by opposing the optical LPF 25 and the dust-proofing member 21, a predetermined void portion 51a is formed. A space portion 51b is formed on the peripheral side of the optical LPF 25, that is, by the CCD case 24, the dust-proofing member supporting member 23, and the dust-proofing member 21. The space portion 51b is a sealed space formed projecting toward the outside of the optical LPF 25 (refer to FIGS. 4 and 5) Further, the space portion 51b is set to be wider than the void portion 51a. A space containing the void portion 51a and the space portion 51b becomes a sealing space 51 which is substantially airtightly sealed by the CCD case 24, the dust-proofing member supporting member 23, the dust-proofing member 21, and the optical LPF 25 as mentioned above.

As mentioned above, according to the first embodiment, the image pick-up device unit 15 in the camera has the sealing structure portion forming the sealing space 51 which is substantially sealed and which is formed at the peripheral portions of the optical LPF 25 and the dust-proofing member 21, including the void portion 51a. The sealing structure portion is arranged to the outside the peripheral portion or the adjacent portion of the optical LPF 25.

Further, according to the first embodiment, the sealing structure portion further comprises the dust-proofing member supporting member 23 for supporting the dust-proofing member 21 in contact with the peripheral portion or the adjacent portion thereof, the CCD case 24 which supports the optical LPF 25 in contact with the peripheral portion or the adjacent portion thereof and which is arranged airtightly in contact with the dust-proofing member supporting member 23 at the predetermined portion of the CCD case 24, and the like.

According to the first embodiment, the camera with the above-mentioned structure is constructed such that the dust-proofing member 21 is opposed to a predetermined position in front of the image pick-up device 27, and the sealing space 51 is sealed at the peripheries of the photoelectrically converting surface of the image pick-up device 27 and the dust-proofing member 21. Consequently, the adhesion of dust, etc. to the photoelectrically converting surface of the image pick-up device 27 is prevented.

In this case, by applying a periodic voltage to the piezoelectric element 22 arranged integrally with the peripheral portion of the dust-proofing member 21 and by applying predetermined vibrations to the dust-proofing member 21, dust and the like adhered to an exposure surface in front of the dust-proofing member 21 are removed.

Figure 6:
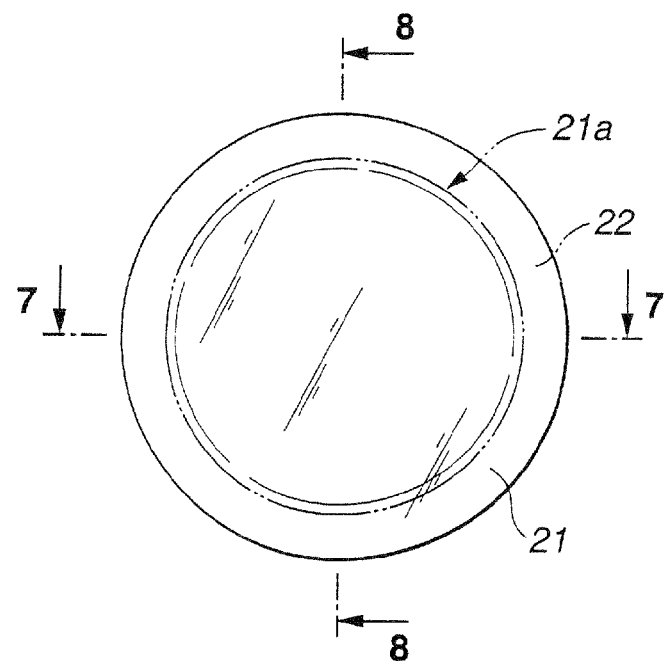
FIG. 6 is a front view showing by extracting only a dust-proofing member and a piezoelectric element integrated with the dust-proofing member in the image pick-up device unit in the camera shown in FIG. 1.
Figure 7:
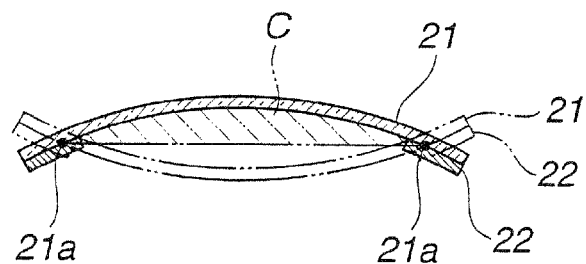
FIG. 7 is a sectional view along a line 7-7 shown in FIG. 6, showing one example of the change in status of the dust-proofing member and the piezoelectric element upon applying a voltage to the piezoelectric element shown in FIG. 6.
Figure 8:
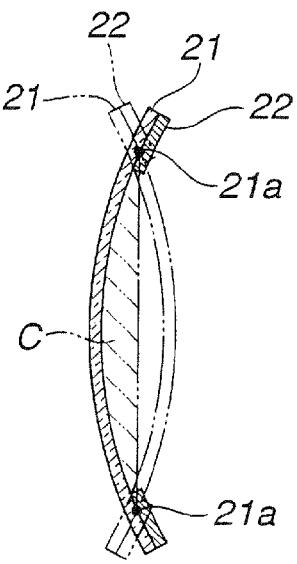
FIG. 8 is a sectional view along a line 8-8 shown in FIG. 6, showing another example of the change in status of the dust-proofing member and the piezoelectric element upon applying the voltage to the piezoelectric element shown in FIG. 6.

FIG. 6 is a front view showing by extracting only the dust-proofing member 21 and the piezoelectric element 22 arranged integrally therewith in the image pick-up device unit 15 in the camera 1. FIGS. 7 and 8 shows the change in status of the dust-proofing member 21 and the piezoelectric element 22 upon applying a driving voltage to the piezoelectric element 22 shown in FIG. 6. FIG. 7 is a sectional view along a line 7-7 shown in FIG. 6, and FIG. 8 is a sectional view along a line 8-8 shown in FIG. 6.

When a negative (−) voltage is applied to the piezoelectric element 22, the dust-proofing member 21 is modified as shown by a solid line in FIGS. 7 and 8. On the other hand, when a positive (+) voltage is applied to the piezoelectric element 22, the dust-proofing member 21 is modified as shown by a dotted line in FIGS. 7 and 8.

In this case, an amplitude is substantially equal to zero at a node upon vibrations as shown by reference symbol 21a shown in FIGS. 6 to 8. Thus, the supporting portion 23c of the dust-proofing member supporting member 23 is abutted onto a portion corresponding to the node 21a. Consequently, the dust-proofing member 21 is efficiently supported without reducing the vibrations.

In this status, the dust-proofing member driving unit 48 is controlled at a predetermined timing and the periodic voltage is applied to the piezoelectric element 22, thereby vibrating the dust-proofing member 21. Thus, it is possible to remove dust and the like adhered to the surface of the dust-proofing member 21.

A resonant frequency in this case is determined depending on the plate thickness, the material, and the shape of the dust-proofing member 21. In one example shown in FIGS. 6 to 8, a first-degree vibration is generated, however, the present invention is not limited to this, and a high-degree vibration may be generated.

Figure 9:
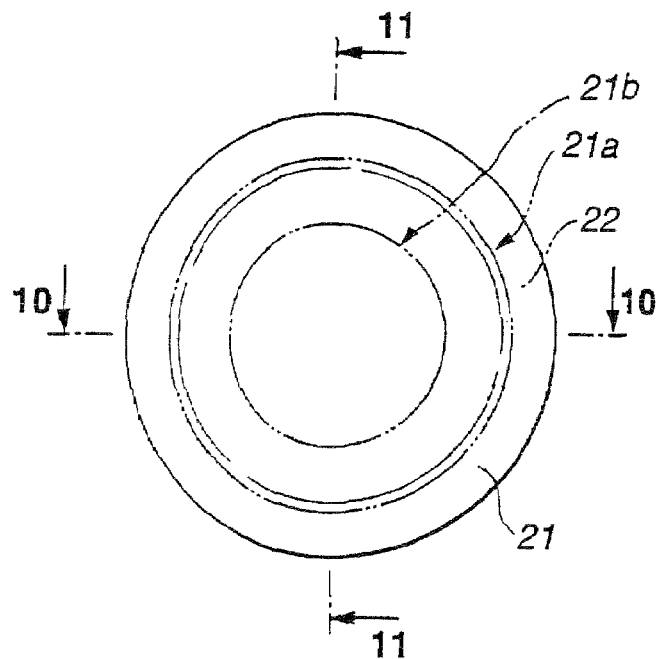
FIG. 9 is a front view showing by extracting only the dust-proofing member and the piezoelectric element integrated with the dust-proofing member in the image pick-up device unit in the camera shown in FIG. 1.
Figure 10:
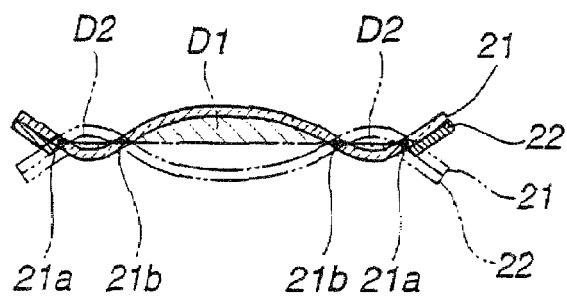
FIG. 10 is a sectional view along a line 10-10 shown in FIG. 9, showing another example of the change in status in the dust-proofing member and the piezoelectric element upon applying the voltage to the piezoelectric element shown in FIG. 9.
Figure 11:
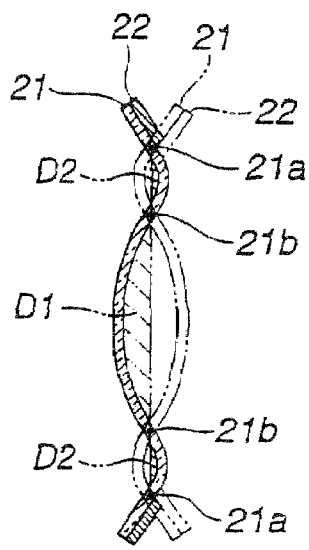
FIG. 11 is a sectional view along a line 11-11 shown in FIG. 9, showing another example of the change in status of the dust-proofing member and the piezoelectric element upon applying the voltage to the piezoelectric element shown in FIG. 9.

In another example shown in FIGS. 9 to 11, a second-degree vibration is generated to the dust-proofing member with the same structure as the example shown in FIGS. 6 to 8.

In this case, FIG. 9 is a front view showing by extracting only the dust-proofing member 21 and the piezoelectric element 22 arranged integrally therewith among members in the image pick-up device unit 15 in the camera 1, similarly to FIG. 6. FIGS. 10 and 11 show the change in status of the dust-proofing member 21 and the piezoelectric element 22 when the voltage is applied to the piezoelectric element 22 shown in FIG. 9. FIG. 10 is a sectional view along a line 10-10 shown in FIG. 9. FIG. 11 is a sectional view along a line 11-11 shown in FIG. 9.

Herein, when a negative (−) voltage is applied to the piezoelectric element 22, the dust-proofing member 21 is modified as shown by a solid line in FIGS. 10 and 11. On the other hand, when a positive (+) voltage is applied to the piezoelectric element 22, the dust-proofing member 21 is modified as shown by a dotted line in FIGS. 10 and 11.

In this case, as shown by reference symbols 21a and 21b shown in FIGS. 9 to 11, the vibration has two pairs of nodes. By setting the supporting portion 23c of the dust-proofing member supporting member 23 such that it is abutted onto a portion corresponding to the node 21a, the dust-proofing member 21 is efficiently supported without reducing the vibration similarly to the above-described example shown in FIGS. 6 to 8.

In this status, the dust-proofing member driving unit 48 is controlled at a predetermined timing and the periodic voltage is applied to the piezoelectric element 22, thereby vibrating the dust-proofing member 21. Thus, it is possible to remove dust and the like adhered to the surface of the dust-proofing member 21.

When the first-degree vibration is generated as shown in FIGS. 6 to 8, in the sealing space 51, the amplitude of the dust-proofing member 21 generates the change in volume shown by reference symbol C. As shown in FIGS. 9 to 11, when the second-degree vibration is generated, the change in volume of the sealing space 51 generated by the amplitude of the dust-proofing member 21 corresponds to the amount obtained by subtracting an area shown by a reference symbol D2×2 from an area shown by a reference symbol D1, that is, [D1−(D2×2)].

The smaller the change in volume to the sealing space 51 is, the smaller the change in inner pressure is small in the sealing space 51. Therefore, it will be understood that the smaller the change in volume of the sealing space 51 is, the vibration can more efficiently be obtained. Thus, in views of the efficiency of the electromechanical transducing, it is considered preferable that the generated vibration is set in a high-degree mode.

As mentioned above, according to the first embodiment, the dust-proofing member 21 is made of the infrared absorbing glass. Consequently, the dust-proofing member 21 has a function for preventing the adhesion of dust, etc. to the photoelectrically converting surface of the image pick-up device 21 and also has a function for absorbing the infrared. No optical member such as the infrared cut-off filter may be provided. Therefore, this contributes to the reduction in size of the camera, particularly, to the reduction in dimension of the camera main body unit in the depth direction.

In general, it is desired that the distance between the rear end surface of the photographing optical system 12a and the photoelectrically converting surface of the image pick-up device 21 becomes shorter as much as possible in views of the optical design. This is because the degree of freedom of the optical design is increased as the distance is shorter. Therefore, according to the first embodiment, as mentioned above, the dimension of the camera main body unit 11 is easily reduced along the optical axis of the photographing optical system 12a (in the depth direction). Thus, the degree of freedom of the optical design of the photographing optical system 12a used for the camera 1 is increased and the photographing optical system 12a is designed with high performance.

The sealing structure portion is formed by sealing the space portion 51b on the peripheral sides of the optical LPF 25 and the dust-proofing member 21 such that the sealing space 51 includes the void portion 51a formed with an opposed relationship between the optical LPF 25 (optical device) and the dust-proofing member 21 and it is substantially sealed. The sealing structure portion is provided to the outside the peripheral portion or the adjacent portion of the optical LPF 25. Thus, upon assuring a constant volume of the space portion, the interval between the optical LPF 25 (optical device) and the dust-proofing member 21 is set to be short.

Generally, it is well known that when the interval between the optical LPF 25 (optical device) and the dust-proofing member 21 is short, the volume of the void portion 51a is reduced and, therefore, upon vibrating the dust-proofing member 21 by the piezoelectric element 22 (member for vibration), an inner pressure of the sealing space 51 is increased. However, when the inner pressure of the sealing space 51 is increased, the vibration of the dust-proofing member 21 caused by the piezoelectric element 22 is inhibited.

On the other hand, when the interval between the optical LPF 25 (optical device) and the dust-proofing member 21 is long so as to ensure the volume of the sealing space 51, the dimension of the image pick-up device unit 15 in the optical axis direction is increased. Thus, this becomes a factor for inhibiting the compact size of the camera 1 in the optical axis direction.

Then, according to the first embodiment, the space portion 51b is provided to the outside the peripheral portion or the adjacent portion of the optical LPF 25. The volume of the sealing space 51 is sufficiently assured and the increase in dimension of the image pick-up device unit 15 in the optical axis direction is suppressed without inhibiting the vibration of the dust-proofing member 21 due to the piezoelectric element 21. Therefore, this easily contributes to the reduction in size of the camera 1 in the optical axis direction.

In the image pick-up device unit 15 in the camera according to the first embodiment, the dust-proofing member 21 is made of the infrared absorbing glass. However, the dust-proofing member 21 is not limited to this and may be formed by another member. According to the following embodiment, the dust-proofing member in the image pick-up device unit of the camera is structured differently from the foregoing.

The structure of the camera according to each of the following embodiments basically has the same structure as that of the camera according to the first embodiment, and only the structure of the dust-proofing member is different. Therefore, the same reference numerals as those according to the first embodiment denote the same members and are not described in detail, and only different portions are specifically described.

Figure 12:
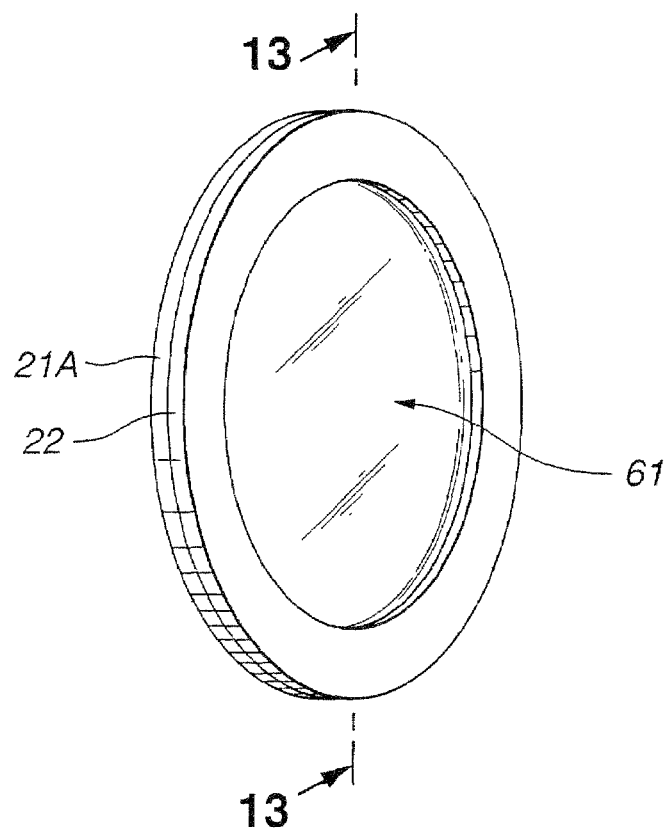
FIG. 12 is a perspective view showing a dust-proofing glass and a member for vibration which is adhered to the dust-proofing glass in an image pick-up device unit in a camera according to a second embodiment of the present invention.
Figure 13:
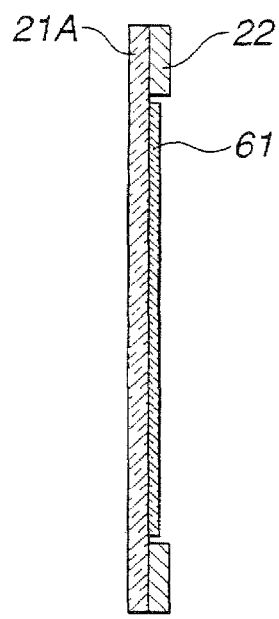
FIG. 13 is a longitudinal sectional view along a line 13-13 shown in FIG. 12.

FIGS. 12 and 13 are diagrams showing by extracting only a dust-proofing glass and a member for vibration (piezoelectric element) which is adhered to the dust-proofing glass according to a second embodiment of the present invention. FIG. 12 is a perspective view showing the dust-proofing member in view of the surface side opposed to the photoelectrically converting surface of the image pick-up device when attaching the dust-proofing member to the image pick-up device unit. FIG. 13 is a sectional view along a line 13-13 shown in FIG. 12.

According to the second embodiment, the dust-proofing member in the image pick-up device unit is circular or polygonal as a whole. The dust-proofing member comprises a glass plate 21A such as an optical glass having a transparent portion in an area having at least a predetermined extension in the radial direction from the center thereof, and an infrared absorbing glass 61 which is adhered to the surface opposed to the photoelectrically converting surface of the image pick-up device 27 at the transparent portion of the glass plate 21A, namely, to the surface on the sealing space 51 side. The infrared absorbing glass 61 is made of fluorine phosphoric acid glass similarly to the first embodiment.

The transparent portion of the plate glass 21A and the infrared absorbing glass 61 are opposed at a predetermined interval in front of the optical LPF 25.

In the outer peripheral portion of the plate glass 21A, namely, on the same surface where the infrared absorbing glass 61 is arranged, the piezoelectric element 22 as the member for vibration is provided.

Other structures are the same as those according to the first embodiment.

According to the second embodiment structured as above, the same advantages as those according to the first embodiment are obtained.

In general, the infrared absorbing glass 61 has characteristics in that it is easily damaged and is weak against water. In consideration thereof, according to the second embodiment, the infrared absorbing glass 61 is arranged in the sealing space 51. Thus, the infrared absorbing glass 61 is protected.

Figure 14:
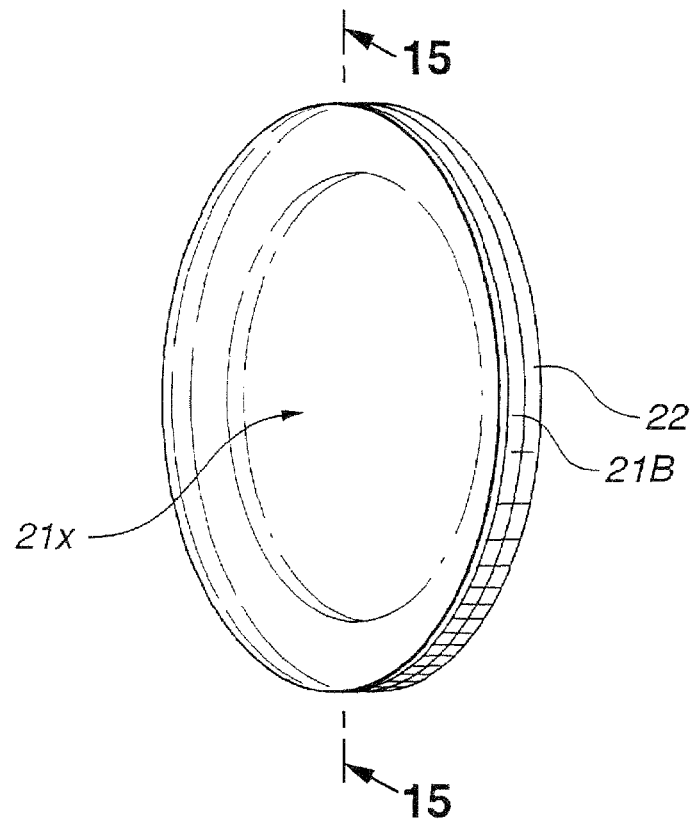
FIG. 14 is a perspective view showing by extracting a dust-proofing glass and a member for vibration which is adhered to the dust-proofing glass in an image pick-up device unit in a camera according to a third embodiment of the present invention.
Figure 15:
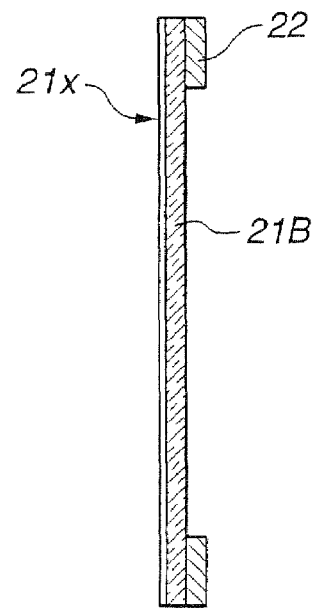
FIG. 15 is a longitudinal sectional view along a line 15-15 shown in FIG. 14.

FIGS. 14 and 15 are diagrams showing by extracting only a dust-proofing glass and a member for vibration (piezoelectric element) which is adhered to the dust-proofing glass according to a third embodiment of the present invention. FIG. 14 is a perspective view showing the dust-proofing member in view seen from the side opposed to the output surface of the photographing optical system when attaching the dust-proofing member to the image pick-up device unit. FIG. 15 is a sectional view along a line 15-15 shown in FIG. 14.

According to the third embodiment, the dust-proofing member in the image pick-up device unit is made of a glass plate 21B with the same shape as that of the dust-proofing member 21 (infrared absorbing glass) similarly to the glass plate 21A according to the second embodiment, in place of the dust-proofing member 21 according to the first embodiment.

An infrared reflection coating 21x is formed, and coats, with a membrane (infrared reflection film) for preventing the transmission and reflection of the infrared, an outer surface side of the transparent portion of the glass plate 21B, that is, the side opposed to the output surface of the photographing optical system 12a which is the reversed side of the sealing space 51, namely, a light incident side (light incident surface).

That is, when the dust-proofing member is attached to the image pick-up device unit 15, the infrared reflection coating 21x of the glass plate 21B is provided on the surface opposed to the output surface of the photographing optical system 12a (refer to FIG. 1) (on the light incident side).

In this case, the infrared reflection coating 21x comprising the infrared reflection film formed by the coating processing to the glass plate 21B as the dust-proofing member is the membrane which reflects the light of the infrared range (having a wavelength of 670 to 680 nm or more) and through which the light in other wavelength areas is transmitted.

The piezoelectric element 22 as the member for vibration is provided at the outer peripheral portion of the plate glass 21B, that is, onto the surface opposed to the photoelectrically converting surface of the image pick-up device 27.

Other structures are the same as those according to the first embodiment.

With the above structure according to the third embodiment, the same advantages as those according to the first embodiment are obtained.

In addition to the foregoing according to the third embodiment, the infrared reflection coating 21x of the glass plate 21B may be subjected to the surface on the side of the sealing space 51. In this case, the same advantages as those according to the third embodiment are obtained.

Figure 16:
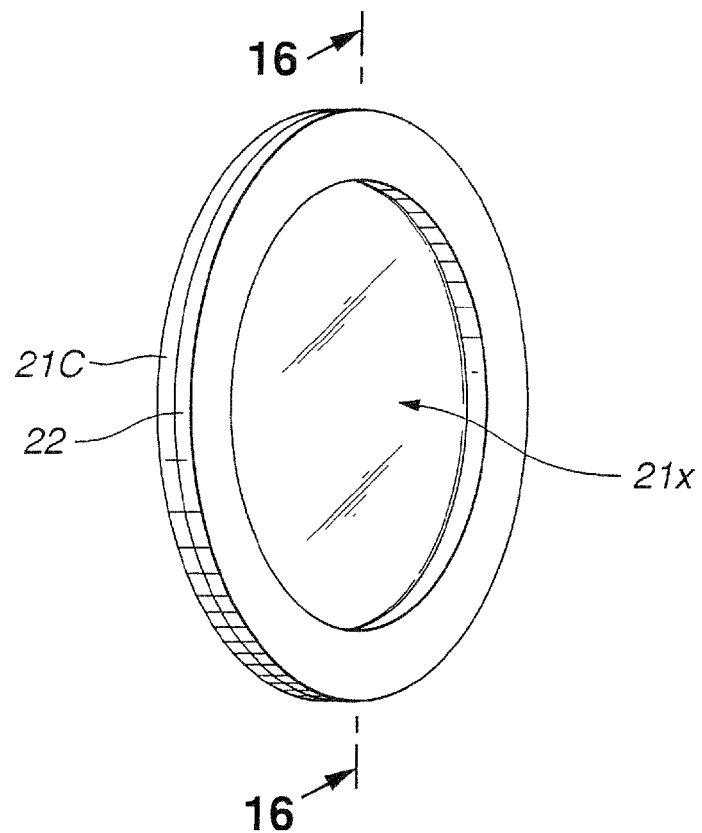
FIG. 16 is a perspective view showing by extracting a dust-proofing glass and a member for vibration which is adhered to the dust-proofing glass in an image pick-up device unit in a camera according to a fourth embodiment of the present invention.
Figure 17:
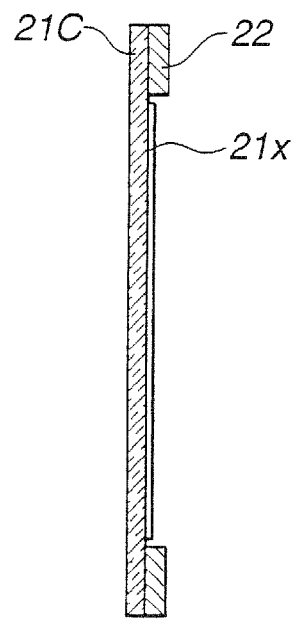
FIG. 17 is a longitudinal sectional view along a line 16-16 in FIG. 15.

FIGS. 16 and 17 are diagrams showing by extracting only a dust-proofing glass and a member for vibration (piezoelectric element) which is adhered to the dust-proofing glass in an image pick-up device unit in a camera according to a forth embodiment of the present invention. FIG. 16 is a perspective view showing the dust-proofing member side opposed to the photoelectrically converting surface of the image pick-up device when the dust-proofing member is attached to the image pick-up device unit. FIG. 17 is a longitudinal sectional view along a line 17-17 shown in FIG. 16.

According to the fourth embodiment, a dust-proofing member 21C in the image pick-up device unit is made of, e.g., an infrared absorbing glass similarly to the first embodiment. The surface on the side of the sealing space 51 as a transparent portion of the dust-proofing member 21C is coated with the infrared reflection coating 21x for reflecting the infrared. The shape of the dust-proofing member 21C is the same as that of the dust-proofing member 21 or the glass plate 21A or 21B according to any of the first to third embodiments.

In other words, according to the fourth embodiment, the infrared reflection coating 21x which coats the dust-proofing member 21C made of the infrared absorbing glass is specifically provided on the surface opposed to the photoelectrically converting surface of the image pick-up device 27 (refer to FIG. 3) when the dust-proofing member is attached to the image pick-up device unit 15.

Similarly to the third embodiment, the piezoelectric element 22 as the member for vibration is provided on the surface on the side opposed to the photoelectrically converting surface of the image pick-up device 27 at the outer peripheral portion of the dust-proofing member 21C.

Other structures are the same as those according to the first embodiment.

According to the fourth embodiment, with the above structure, the same advantages as those according to the first embodiment are obtained.

Incidentally, according to the third and fourth embodiments, a predetermined surface of the glass plate 21B or the dust-proofing member 21C (infrared absorbing glass) is coated with the infrared reflection coating 21x. In this case, the glass plate 21B or the dust-proofing member 21C is arranged at a position sufficiently apart from the photoelectrically converting surface of the image pick-up device 27. Thus, if coating unevenness is caused in the infrared reflection coating 21x, this does not influence adversely on the image formed onto the photoelectrically converting surface of the image pick-up device 27.

According to the fourth embodiment, the infrared reflection coating 21x of the dust-proofing member 21C coats the surface on the side of the sealing space 51. Thus, advantageously, the coating surface is protected.

Further, in addition to the fourth embodiment, the infrared reflection coating 21x of the dust-proofing member 21C may coat the surface on the side opposed to the output surface of the photographing optical system 12a, that is, the surface on the light incident side. In this case, the same advantages as those according to the fourth embodiment are obtained.

The dust-proofing member in the image pick-up device unit of the present invention has the function for absorbing or reflecting the infrared according to the first to fourth embodiments. In addition, the dust-proofing member can additionally have a low-pass filter function. Hereinbelow, a description thereof is given according to a fifth embodiment.

Figure 18:
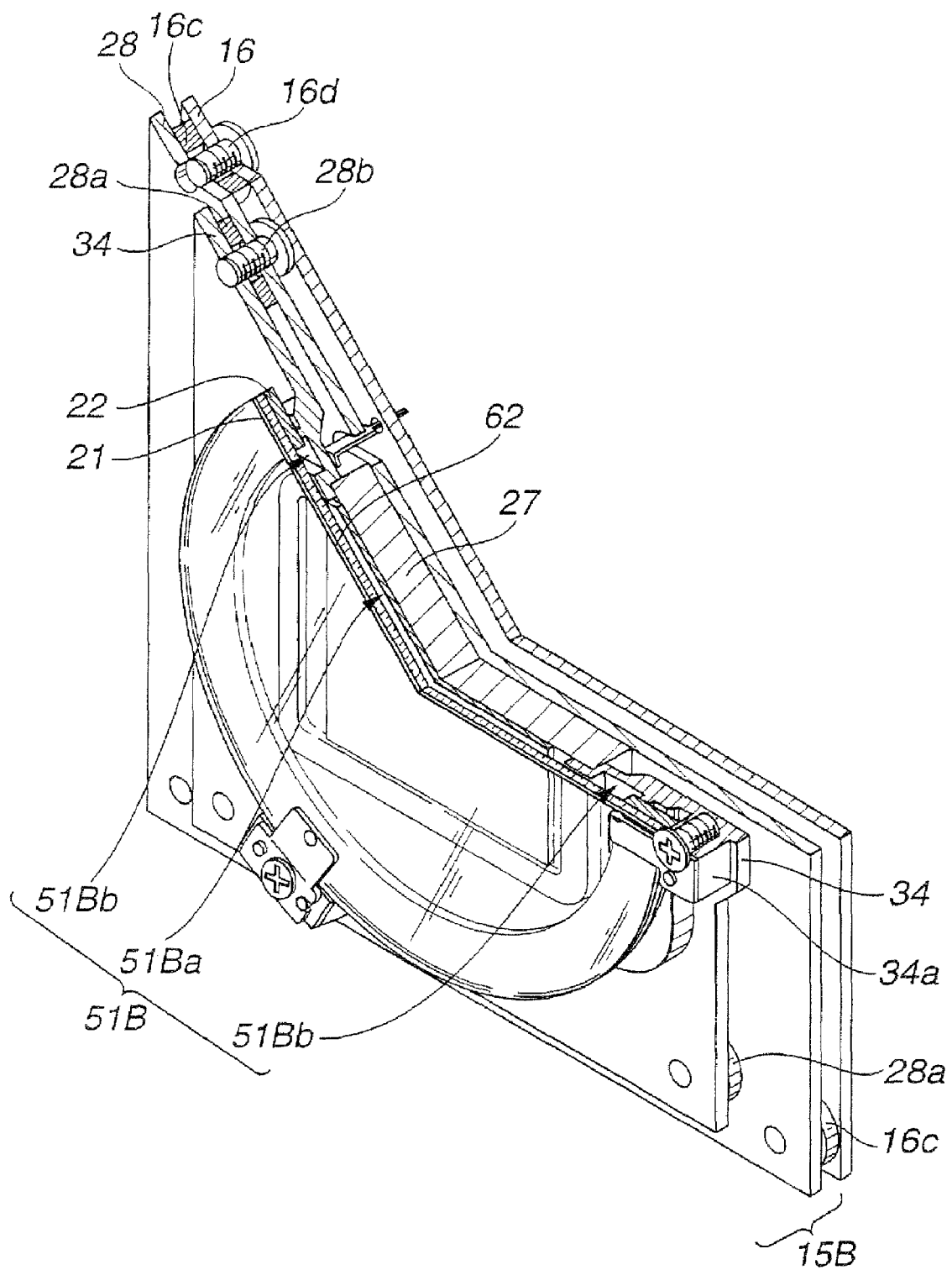
FIG. 18 is a perspective view showing by extracting a part of an image pick-up device unit in a camera, that is, a cut-off part of the assembled image pick-up device unit according to a fifth embodiment of the present invention.
Figure 19:
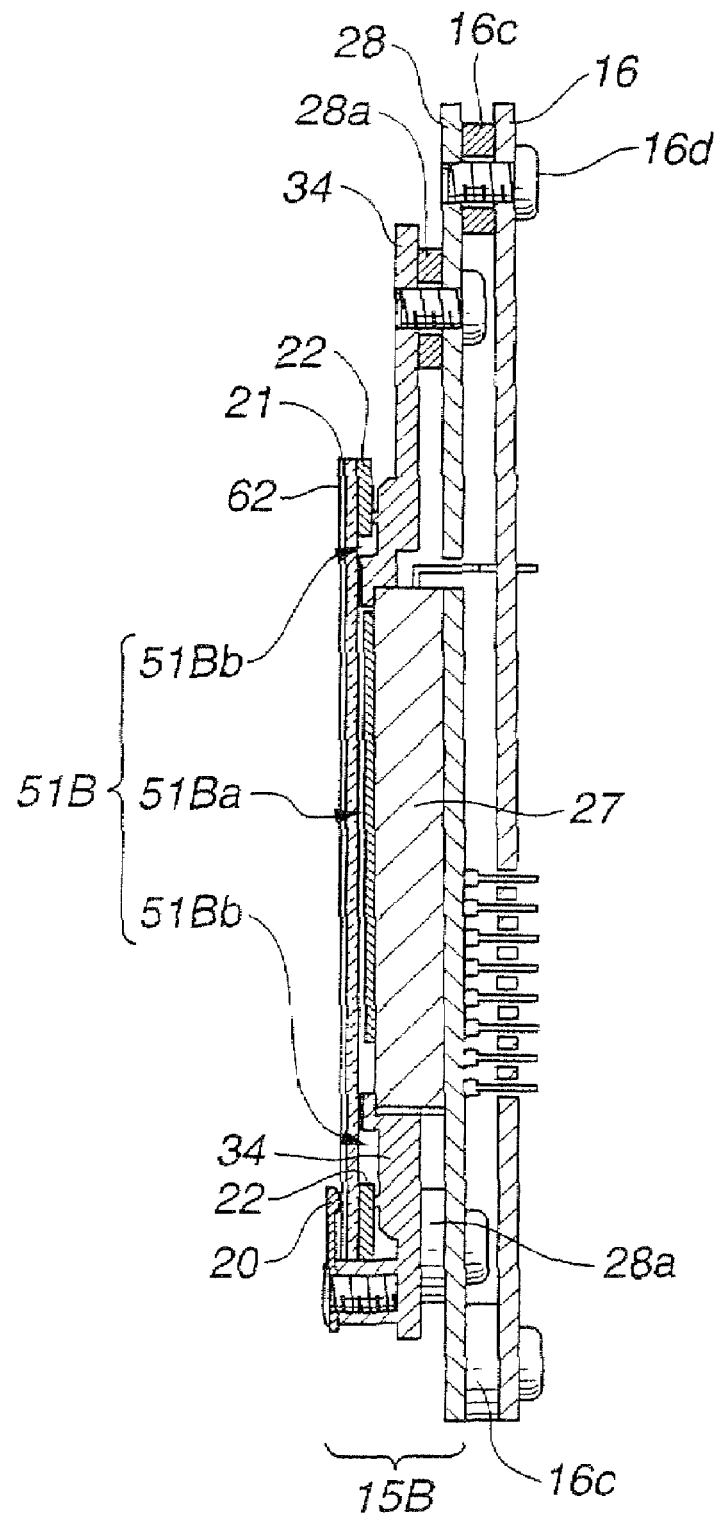
FIG. 19 is a sectional view along a cut-off plane shown in FIG. 18.

FIGS. 18 and 19 are diagrams showing by extracting only a part of an image pick-up device unit in a camera according to the fifth embodiment of the present invention. FIG. 18 is a perspective view showing a cut-off part of the assembled image pick-up device unit, corresponding to FIG. 4 according to the first embodiment. FIG. 19 is a sectional view along a cut-off plane shown in FIG. 18, corresponding to FIG. 5 according to the first embodiment.

Referring to FIGS. 18 and 19, similarly to FIGS. 4 and 5 according to the first embodiment, only the main portion of the image pick-up device unit (15B) is illustrated and the shutter unit (14) is not shown. For the purpose of showing a positional relationship of the members, the main circuit board 16 is shown together, similarly to the first embodiment.

According to the fifth embodiment, the image pick-up device unit 15B is formed by excluding the optical LPF 25 according to the first to fourth embodiments. Further, unlike the first embodiment, a dust-proofing member supporting and CCD case (hereinafter, referred to as a CCD case) 34 is a single member formed by integrating the dust-proofing member supporting member (23) and the CCD case (24) according to the first embodiment, without using both of the members.

The CCD case 34 is integrally constituted by a first portion and a second portion. That is, the first portion functions as the dust-proofing filter supporting unit for supporting the dust-proofing member 21 in contact with the peripheral portion or the adjacent portion of the dust-proofing member 21. The second portion functions as the image pick-up device accommodating case unit for supporting the photoelectrically converting surface of the image pick-up device 27 in contact with the peripheral portion or the adjacent portion of the image pick-up device 27. Thus, the sealing structure portion is formed.

The sealing structure portion in the image pick-up device unit 15B in the camera is structured as follows according to the fifth embodiment.

That is, a predetermined void portion 51Ba is formed in a space formed by opposing the photoelectrically converting surface of the image pick-up device 27 and the dust-proofing member 21. A space portion 51Bb is formed by the CCD case 34 and the dust-proofing member 21, extending to the outside of the photoelectrically converting surface of the image pick-up device 27 on the peripheral side thereof. The space portion 51Bb is set to be wider than the void portion 51Ba. A space containing the void portion 51Ba and the space portion 51Bb forms the sealing space 51B which is substantially airtightly sealed by the CCD case 34, the dust-proofing member 21, and the front surface (photoelectrically converting surface) of the image pick-up device 27.

As mentioned above, in the image pick-up device unit 15B in the camera according to the fifth embodiment, the sealing structure portion includes the sealing space 51B which is formed at the photoelectrically converting surface of the image pick-up device 27 and at the periphery of the dust-proofing member 21, having the void portion 51Ba, and which is substantially sealed. The sealing structure portion is provided at the outside position of the periphery or adjacent portion of the photoelectrically converting surface of the image pick-up device 27.

Further, according to the fifth embodiment, the sealing structure portion includes the CCD case 34 which is formed by integrating the first portion and the second portion. That is, the first portion supports the dust-proofing member 21 in contact with the peripheral or the adjacent portion thereof. The second portion supports the photoelectrically converting surface of the image pick-up device 27 in contact with the peripheral or the adjacent portion thereof.

According to the fifth embodiment, the image pick-up device unit 15B is formed by excluding the optical LPF as mentioned above. Therefore, the dust-proofing member 21 has a transparent portion which is arranged and opposed to the front of the photoelectrically converting surface of the image pick-up device 27 at a predetermined interval.

Similarly to the first embodiment, the dust-proofing member 21 is made of the infrared absorbing glass, such as fluorine phosphoric acid glass, having a function for absorbing the infrared. The shape of the dust-proofing member 21 is the same as that according to the first embodiment.

An optical device 62 having a low-pass filter function for limiting the transmission of a predetermined high spatial frequency component is adhered to a predetermined surface of the dust-proofing member 21 made of the infrared absorbing glass, namely, to a surface on the side opposed to the output surface of the photographing optical system 12a.

Other structures are the same as those according to the first embodiment. According to the fifth embodiment, the action upon removing the dust adhered to the surface of the dust-proofing member 21 by vibrating the dust-proofing member 21 by using the piezoelectric element 22 is the same as that according to the first embodiment.

As mentioned above, by using the image pick-up device unit 15B which is formed by excluding the optical LPF 25 from the first embodiment structure according to the fifth embodiment, the same advantages as those according to the first embodiment are obtained.

The optical LPF 25 according to the first embodiment is excluded and the function as the low-pass filter is added to the dust-proofing member 21. Consequently, the number of members is reduced and this contributes to the reduction in dimension of the camera main body unit in the depth direction.

Further, according to the fifth embodiment, the CCD case 34 is formed by integrating the first portion having the function as the dust-proofing filter supporting unit and the second portion having the function as the image pick-up device accommodating case unit. Therefore, the structure of the image pick-up device unit 15B is simplified and the number of the members is reduced. Further, this contributes to the simplification of the manufacturing processing and the reduction in manufacturing costs.

In this case, the optical device 62 is adhered to the surface on the exposed side (outer surface side) of the dust-proofing member 21 as the infrared absorbing glass. Thus, advantageously, the outer surface side of the dust-proofing member 21 is protected by the optical device 62.

According to the fifth embodiment, the optical device 62 having the low-pass filter function is adhered to the predetermined surface of the dust-proofing member 21 (infrared absorbing glass) on the side opposed to the output surface of the photographing optical system 12a. However, the arrangement of the optical device 62 is not limited to this. For example, the optical device 62 may be adhered at the same position as that of the infrared absorbing glass 61 according to the second embodiment (refer to FIGS. 12 and 13), that is, on a predetermined surface of the dust-proofing member 21 on the side opposed to the photoelectrically converting surface of the image pick-up device 27.

With the above structure, the same advantages as those according to the fifth embodiment are obtained.

Further, in this case, advantageously, the optical device 62 is protected since the optical device 62 is arranged in the sealing space 51.

The dust-proofing member arranged in front of the image pick-up device 27 has both the infrared absorbing function (or the infrared reflecting function) and the low-pass filter function. However, it is not limited to that according to the fifth embodiment and may variously be modified.

According to the fifth embodiment, the optical device 62 having the low-pass filter function is adhered to the predetermined surface of the dust-proofing member 21 made of the infrared absorbing glass, namely, to the surface on the side opposed to the output surface of the photographing optical system 12a.

According to a modification of the fifth embodiment, the optical device 62 having the low-pass filter function is adhered to one surface of the dust-proofing member 21 (infrared absorbing glass), that is, on the surface on the side of the sealing space 51B (the surface on the side opposed to the photoelectrically converting surface of the image pick-up device 27).

In addition to the above modification, the optical device 62 having the low-pass filter function may be provided for the structure according to the second embodiment (refer to FIGS. 12 and 13).

In other words, the dust-proofing member according to the second embodiment is formed by adhering the infrared absorbing glass 61 to one surface of the glass plate 21A (surface on the side of the sealing space 51). In addition, the optical device 62 may be adhered to the other surface of the glass plate 21A (surface on the side of the photographing optical system 12a).

Further, the optical device 62 may be overlapped and adhered to the infrared absorbing glass 61 which is adhered to the one surface of the glass plate 21A (surface on the side of the sealing space 51) (not shown).

The dust-proofing member according to the third embodiment has the infrared reflection coating 21x which is formed to the other surface of the glass plate 21B (surface on the side of the photographing optical system 12a). In addition, the optical device 62 having the low-pass filter function can be adhered to the one surface of the glass plate 21B (surface on the side of the sealing space 51).

In addition, the optical device 62 may be overlapped and adhered to the infrared reflection coating 21x which is formed to the one surface of the glass plate 21B (surface on the side of the sealing space 51) (not shown).

According to the fourth embodiment, the dust-proofing member has the infrared reflection coating 21x which is formed to the one surface of the dust-proofing member 21C made of the infrared absorbing glass (on the surface on the side of the sealing space 51). In addition, the optical device 62 having the low-pass filter function can be adhered to the other surface of the dust-proofing member 21C (infrared absorbing glass) (on the surface on the side of the photographing optical system 12a).

In addition, the optical device 62 may be overlapped and adhered to the infrared reflection coating 21x which is formed to the one surface of the dust-proofing member 21C (infrared absorbing glass) (on the surface on the side of the sealing space 51) (not shown).

As another dust-proofing member, the infrared reflection coating 21x may be formed onto a predetermined surface of the optical device 62 having the low-pass filter, and may be adhered to the predetermined surface of the dust-proofing member 21 (infrared absorbing glass) similar to that according to the first embodiment or to the predetermined surface of the glass plate 21A or 21C similar to that according to the second or third embodiment. In this case, the adhering surface to the infrared reflection absorbing glass (dust-proofing member 21) of the optical device (62) with the low-pass filter having the infrared reflection coating 21x or the glass plate (21A or 21B) may be any of the surface on the side of the sealing space 51 and the surface of the photographing optical system 12a.

As mentioned above, the same advantages as those according to the first embodiment are obtained by the dust-proofing member having both the infrared absorbing function (or the infrared reflection function) and the low-pass filter function according to the various embodiments.

The above embodiments show the example of the dust-proofing member having the infrared absorbing (or reflection) function and the example of further having the low-pass filter function.

Further, the dust-proofing member may have only the low-pass filter function.

For example, according to the first embodiment, the dust-proofing member 21 is made of the infrared absorbing glass. However, the dust-proofing member 21 may include the optical device 62 having the low-pass filter function in place of the thus-formed structure.

In the dust-proofing member according to the second embodiment, the infrared absorbing glass 61 is adhered to the glass plate 21A. However, in place of the infrared absorbing glass 61, the optical device 62 having the low-pass filter function may be adhered. In this case, the optical device 62 may be adhered to either the surface on the sealing space 51 or the surface on the side of the photographing optical system 12a. Herein, the structure in which the optical device 62 is adhered to the surface on the side of the sealing space 51 is corresponding to the second embodiment.

The structure in which the optical device 62 is adhered to the surface on the side of the photographing optical system 12a is corresponding to the third embodiment. That is, in place of the infrared reflection coating 21x of the dust-proofing member according to the third embodiment, the optical device 62 is adhered.

As mentioned above, according to the embodiments, extremely easily, the dust-proofing member can be constituted by providing any necessary functions of the dust-proofing function, the infrared absorbing (or reflection) function, and the low-pass filter function in consideration of the combination of the members forming the dust-proofing member.

It should be understood that the present invention is not limited to the precise disclosed embodiments, and various changes and modifications thereof can be made without departing from the spirit or scope of the invention.

What is claimed is:

1. A camera comprising:
   a photographing lens which inputs a subject image;
   an image pick-up device which comprises a photoelectrically converting surface, and which produces an image signal corresponding to beams of the subject image irradiated onto the photoelectrically converting surface;
   a dust-proofing member which is interposed between the photographing lens and the image pick-up device, and which comprises a transparent portion through which a visible light component is transmitted among beams of the subject image input by the photographing lens to the image pick-up device, the transparent portion being opposed to a front of the image pick-up device at a predetermined interval;
   a vibration member which is arranged at a peripheral portion of the dust-proofing member and vibrates the dust-proofing member;
   a sealing part which seals a space between the image pick-up device and the dust-proofing member; and a spring pressing member which presses the dust-proofing member at periphery thereof toward the sealing part.

2. The camera according to claim 1, wherein the spring pressing member presses the dust-proofing member at a plurality of points on the periphery thereof.

3. The camera according to claim 1, wherein an infrared reflection layer is provided on the dust-proofing member on a side facing the photographing lens.

4. The camera according to claim 1, wherein the dust-proofing member comprises an infrared absorbing glass and an infrared reflection layer is provided on a surface of the infrared absorbing glass.

5. The camera according to claim 4, wherein an infrared refection layer is provided on the infrared absorbing glass on a side facing the photographing lens.

6. The camera according to claim 1, wherein the dust-proofing member has a low-pass filter function which limits transmission of a high spatial frequency component.

7. The camera according to claim 1, further comprising a photographing lens attaching unit for attaching a photographing lens, wherein the photographing lens is detachable from the photographing lens attaching unit.

8. A camera comprising:

an image pick-up device which comprises a photoelectrically converting surface, and which produces an image signal corresponding to beams irradiated onto the photoelectrically converting surface;

a dust-proofing member comprising a transparent portion through which a visible light component is transmitted, the transparent portion being opposed to a front of the image pick-up device at a predetermined interval;

a vibration member which is arranged at a peripheral portion of the dust-proofing member, and which vibrates the dust-proofing member;

a sealing part which seals a space between the image pick-up device and the dust-proofing member; and a spring pressing member which presses the dust-proofing member at periphery thereof toward the sealing part.

9. The camera according to claim 8, wherein the spring pressing member presses the dust-proofing member at a plurality of points on the periphery thereof.

10. The camera according to claim 8, wherein an infrared reflection layer is provided on the dust-proofing member on a side facing a photographing lens.

11. The camera according to claim 8, wherein the dust-proofing member comprises an infrared absorbing glass and an infrared reflection layer is provided on a surface of the infrared absorbing glass.

12. The camera according to claim 11, wherein an infrared refection layer is provided on the infrared absorbing glass on a side facing the photographing lens.

13. The camera according to claim 8, wherein the dust-proofing member has a low-pass filter function which limits transmission of a high spatial frequency component.

14. The camera according to claim 8, further comprising a photographing lens attaching unit for attaching a photographing lens, wherein the photographing lens is detachable from the photographing lens attaching unit.

* * * * *